US009300579B2

(12) United States Patent
Frost et al.

(10) Patent No.: US 9,300,579 B2
(45) Date of Patent: Mar. 29, 2016

(54) PACKET METADATA CHANNELS CARRYING INFRASTRUCTURE METADATA IN NETWORKS

(71) Applicants: Daniel C. Frost, Middlesex (GB); Simon James Trevor Spraggs, Hayling Island (GB); Rex Emmanuel Fernando, Dublin, CA (US); Stewart Frederick Bryant, Merstham (GB); Jim Guichard, New Boston, NH (US); Carlos M. Pignataro, Raleigh, NC (US); Clarence Filsfils, Brussels (BE)

(72) Inventors: Daniel C. Frost, Middlesex (GB); Simon James Trevor Spraggs, Hayling Island (GB); Rex Emmanuel Fernando, Dublin, CA (US); Stewart Frederick Bryant, Merstham (GB); Jim Guichard, New Boston, NH (US); Carlos M. Pignataro, Raleigh, NC (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 13/863,013

(22) Filed: Apr. 15, 2013

(65) Prior Publication Data

US 2014/0226662 A1      Aug. 14, 2014

Related U.S. Application Data

(60) Provisional application No. 61/763,224, filed on Feb. 11, 2013.

(51) Int. Cl.
*H04L 12/26*     (2006.01)
*H04L 12/741*    (2013.01)
*H04L 12/723*    (2013.01)

(52) U.S. Cl.
CPC ............... *H04L 45/74* (2013.01); *H04L 45/50* (2013.01)

(58) Field of Classification Search
CPC ......... H04L 45/74; H04L 12/28; H04L 12/56; H04L 43/50
See application file for complete search history.

(56) References Cited

U.S. PATENT DOCUMENTS

| | | | |
|---|---|---|---|
| 8,345,682 B2 | 1/2013 | Pignataro et al. | |
| 2002/0059432 A1* | 5/2002 | Masuda et al. | 709/227 |
| 2003/0043798 A1* | 3/2003 | Pugel | 370/389 |
| 2003/0154110 A1* | 8/2003 | Walter et al. | 705/3 |
| 2005/0021803 A1* | 1/2005 | Wren, III | 709/231 |
| 2005/0198304 A1* | 9/2005 | Oliver et al. | 709/227 |
| 2009/0217318 A1* | 8/2009 | VerSteeg et al. | 725/32 |

OTHER PUBLICATIONS

Kompella et al., "The Use of Entropy Labels in MPLS Forwarding," RFC 6790, The Internet Society, Reston, VA, USA, Nov. 2012 (twenty-five pages).
Bocci et al., "MPLS Generic Associated Channel," RFC 5586, The Internet Society, Reston, VA, USA, Jun. 2009 (nineteen pages).

\* cited by examiner

*Primary Examiner* — Anez Ebrahim
(74) *Attorney, Agent, or Firm* — The Law Office of Kirk D. Williams (57) ABSTRACT

In one embodiment, an apparatus in a network determines particular metadata to communicate infrastructure information associated with a particular packet to another apparatus in the network. The apparatus sends into the network the particular packet including a metadata channel, comprising said particular metadata, external to the payload of the particular packet. Examples of infrastructure metadata carried in a packet include, but are not limited to, information defining service chaining for processing of the packet, contextual information for processing of the packet, specific handling instructions of the packet, and operations, maintenance, administration (OAM) instrumentation of the packet.

20 Claims, 5 Drawing Sheets

METADATA PACKET (350)
FIGURE 3A

METADATA COMPONENT STRUCTURE (300)
FIGURE 3B

METADATA CHANNEL HEADER FORMAT (308)
FIGURE 3C

METADATA ENCAPSULATION FORMAT
(400)
FIGURE 4

METADATA IN IP ENCAPSULATION
(500)
FIGURE 5

FIGURE 6

United States Patent US 9,300,579 B2

PACKET METADATA CHANNELS CARRYING INFRASTRUCTURE METADATA IN NETWORKS

CROSS-REFERENCE TO RELATED APPLICATIONS

This application claims the benefit of U.S. Provisional Application No. 61/763,224, filed Feb. 11, 2013.

TECHNICAL FIELD

The present disclosure relates generally to packet switching, and in particular, related to metadata channels within packets for carrying metadata in packet networks.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

A packet is a formatted unit of data transported in a packet network. A packet consists of two kinds of data: transport control information and user data (also known as payload). The header of a packet includes the transport control information (e.g., source and destination addresses, error detection codes like checksums, and sequencing information), which provides data the packet network needs to deliver the user data across the packet network. The payload of a packet includes the user data.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with packet metadata channels carrying infrastructure metadata in networks. In one embodiment, an apparatus in a network determines particular metadata to communicate infrastructure information associated with a particular packet to another apparatus in the network. The apparatus sends into the network the particular packet including a metadata channel, comprising said particular metadata, external to the payload of the particular packet.

2. Description

Disclosed are, inter alia, methods, apparatus, computer-storage media, mechanisms, and means associated with packet metadata channels carrying infrastructure metadata in networks. As used herein, "infrastructure metadata" refers to information, included in a packet outside of the payload of a packet for use by devices (e.g., packet switching devices, hosts) in a network (e.g., service provider network) in signaling information for use by other devices in the network in processing the packet (e.g., the packet itself and/or user data included in the packet). In one embodiment, infrastructure metadata includes service chaining information, which may include, inter alia, specified application(s) to be applied to a packet, and/or service node(s) for apply applications to the packet. In one embodiment, a particular application is defined to be a particular service applied to one or more packets; while in one embodiment, a particular application is defined to be a particular service applied to one or more packets by a particular device. In one embodiment, infrastructure metadata includes contextual information, which may include, inter alia, specified profiles, user names, and/or other identifying information. In one embodiment, infrastructure metadata includes instrumentation information, which may include, inter alia, operations, administrative, and maintenance (OAM) information for measuring characteristics (e.g., packet loss, latencies) real customer traffic in the data plane.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. A packet switching device refers to an apparatus (e.g., router, switch), which would include, an internal or external application processor or host device for applying services to packets.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing said read value—the value is obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment includes, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term. "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with packet metadata channels carrying infrastructure metadata in networks. One embodiment includes a method, comprising: determining, by an apparatus in a network, particular metadata to communicate infrastructure information associated with a particular packet to another apparatus in the network; and sending, from the apparatus into the network, the particular packet including a metadata channel, comprising said particular metadata, external to the payload of the particular packet.

One embodiment includes receiving the particular packet by the apparatus from a source external to the apparatus. In one embodiment, the apparatus and said another apparatus are each edge packet switching devices and the network is a provider network; and wherein the method includes receiving the particular packet by the apparatus from a client network external to the provider network. In one embodiment, wherein said operation of determining particular metadata is based on an identification of an application corresponding to the particular packet and on said another apparatus.

In one embodiment, said particular metadata includes information for instrumenting the particular packet. In one embodiment, said particular metadata includes information defining service chaining for processing the particular packet. In one embodiment, said information defining service chaining for processing the particular packet includes identification of a service to be applied in processing of the particular packet within the network by a device other than by the apparatus.

In one embodiment, wherein said particular metadata includes contextual information for processing of the particular packet. In one embodiment, said contextual information for processing of the particular packet includes a profile identification or a user name.

In one embodiment, said particular metadata includes information defining one or more infrastructure specific handling instructions of the particular packet.

In one embodiment, the metadata channel includes a metadata channel header identifying the presence of said particular metadata in the particular packet. In one embodiment, the particular packet is a Multiprotocol Label Switching (MPLS) packet. In one embodiment, the particular packet is an Internet Protocol (IP) packet. In one embodiment, the apparatus is a packet switching device. In one embodiment, the apparatus is a host device.

One embodiment includes: receiving, by said another apparatus, the particular packet; performing, by said another apparatus, infrastructure-related processing of said received particular packet based on said particular metadata included in said received particular packet. In one embodiment, said another apparatus is an edge packet switching device and the network is a provider network; and wherein the method includes operations performed by said another apparatus, including: receiving the particular packet; removing said metadata channel from the particular packet; and sending said particular packet, without said metadata channel, onto a client network external to the provider network.

One embodiment includes a packet switching device, comprising: one or more processing elements; memory; a plurality of interfaces configured to send and receive packets; and one or more packet switching mechanisms configured to packet switch packets among said interfaces; wherein said one or more processing elements are configured to perform operations, including: determining particular metadata to communicate infrastructure information associated with a received particular packet to another packet switching device in a network; and causing to be sent from the packet switching device the particular packet including a metadata channel, comprising said particular metadata, external to the payload of the particular packet.

One embodiment includes a packet switching device, comprising: one or more processing elements; memory; a plurality of interfaces configured to send and receive packets; and one or more packet switching mechanisms configured to packet switch packets among said interfaces; wherein said one or more processing elements are configured to perform operations, including: performing infrastructure-related processing of a received particular packet based on particular metadata included in a metadata channel in said received particular packet external to the payload of said received particular packet. In one embodiment, the metadata channel includes a metadata channel header identifying the presence of said particular metadata in said received particular packet.

Figure 1:
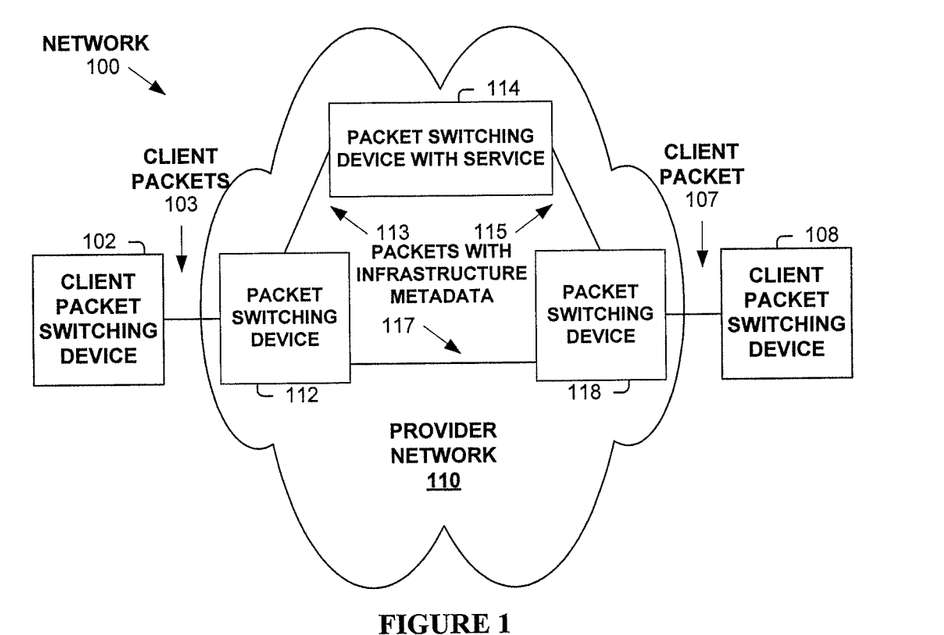
FIG. 1 illustrates a network operating according to one embodiment.

Expressly turning to the figures, FIG. 1 illustrates a network 100 including client packet switching devices 102 and 108 communicatively coupled via provider network 110. Provider network 110 includes multiple packet switching devices 112, 114, 118.

In one embodiment, client packet switching device 102 sends client packets (103) to provider edge packet switching device 112. In one embodiment shown, packets (113, 115, 117) may, or may not, include infrastructure metadata, while client packets (103, 107) do not as the infrastructure metadata is used to signal information within provider network (or other network in one embodiment).

For example in one embodiment, packet switching device 112 receives a packet and determines whether or not to add infrastructure metadata to the packet. Based on the flow or other characteristic(s) of the packet, packet switching device 112 determines that it should send the packet to packet switching device 114 which includes service processing (e.g., a firewall, deep packet inspection) to apply a firewall based on a particular client profile (e.g., corresponding to the client of packet switching devices 102 and 108). Packet switching device 112 adds corresponding infrastructure metadata specifying the firewall application and customer profile, and sends the packet to packet switching device with firewall service 114. Packet switching device 114 receives this information, and based on the infrastructure metadata information, processes the packet accordingly (e.g., applies the firewall application using the specified customer profile). If the packet is not dropped, packet switching device 114 sends the packet, with or without infrastructure metadata, to packet switching device 118. Packet switching device 118 processes the packet, which includes removing any infrastructure metadata and sending the packet to client packet switching device 108.

In one embodiment, edge packet switching device(s) (112, 118) and core packet switching device(s) (114) may add or remove infrastructure metadata to packets. For example in one embodiment, packet switching device 112 is sending packets to packet switching device 118 via packet switching device 114. Packet switching device 114 may add infrastructure metadata to packets to instrument these packets (e.g., adding a time stamp or marking to allow calculation of packet loss and/or delay, and/or to determine correct/incorrect packet sequencing within the network). Typically, infrastructure metadata is carried only within the network which it is relevant, and is typically removed by an edge packet switching device before sending a packet into a different network.

Figure 2A:
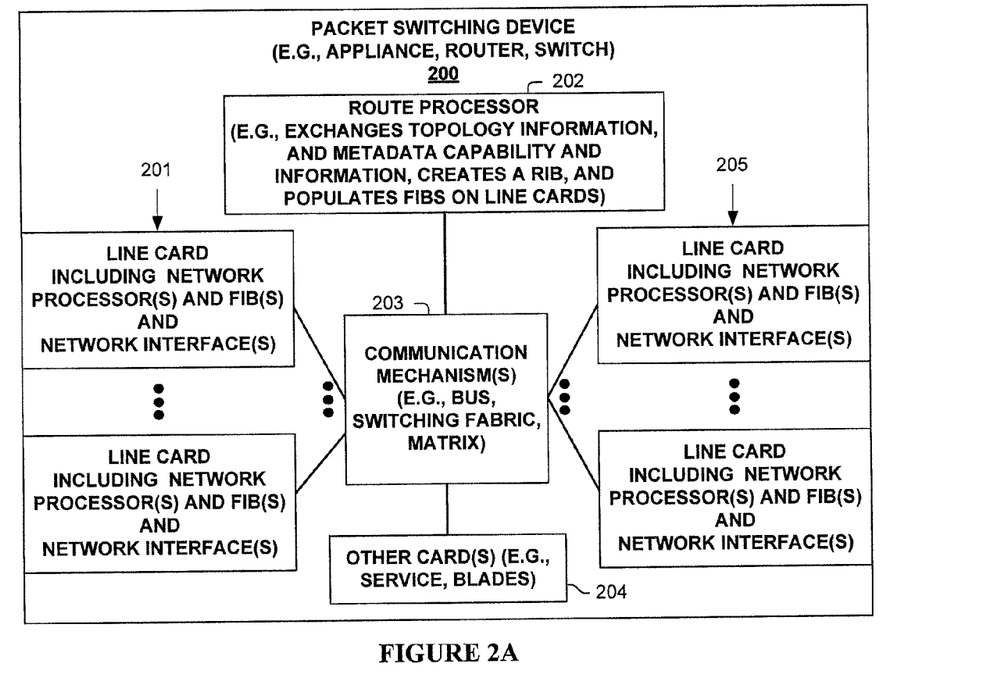
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links, and with one or more processing elements that are used in one embodiment in processing packets to add or remove infrastructure metadata to/from packets and/or processing packets based on infrastructure metadata included in the packets. Packet switching device 200 also has a control plane with one or more processing elements 202 for managing the control plane and/or control plane processing of packets, which may include adding or removing infrastructure metadata to/from packets, processing packets based on infrastructure metadata included in the packets, and/or updating line cards 201, 205 for processing of packets. Packet switching device 200 also includes other cards 204 (e.g., service/application cards, blades) which include processing elements that are used in one embodiment to process packets associated with infrastructure metadata, and some communication mechanism 203 (e.g., bus, switching fabric, matrix) for allowing its different entities 201, 202, 204 and 205 to communicate.

Figure 2B:
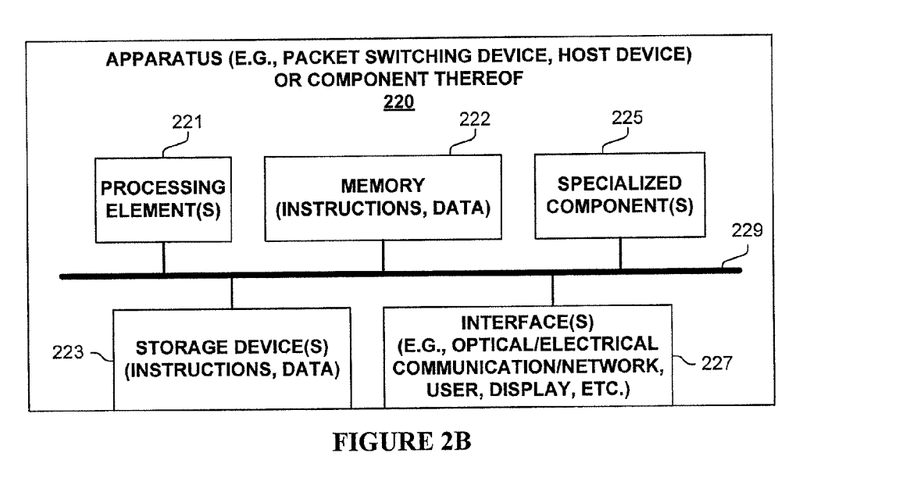
FIG. 2B illustrates an apparatus according to one embodiment.

FIG. 2B is a block diagram of an apparatus 220 (e.g., node, host, packet switching device, network management device) used in one embodiment in processing packets to add or remove infrastructure metadata to/from packets and/or processing packets based on infrastructure metadata included in the packets. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations including applying services/applications, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3A:
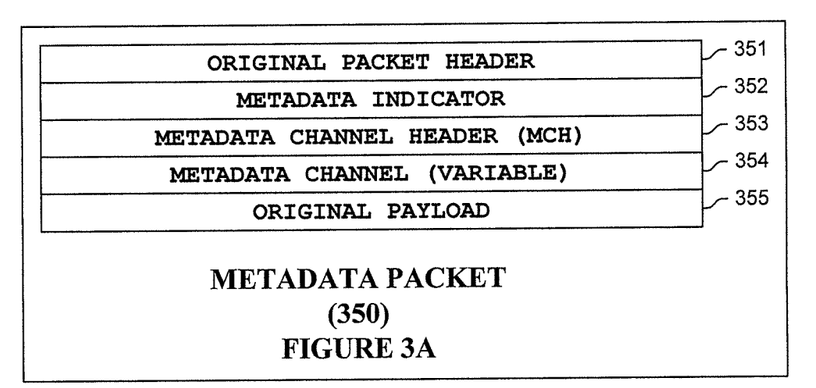
FIG. 3A illustrates a metadata packet according to one embodiment.

FIG. 3A illustrates a packet format 350 used for carrying metadata added to an original packet. In one embodiment, metadata packet 350 includes: the original packet header 351 (possibly modified); a metadata indicator 352 to indicate that a metadata channel header and metadata is included (and possibly defining the position of such) in metadata packet 350; a metadata channel header 353; a metadata channel 354 (including the metadata); and the original packet payload 355 (possibly modified).

Figure 3B:
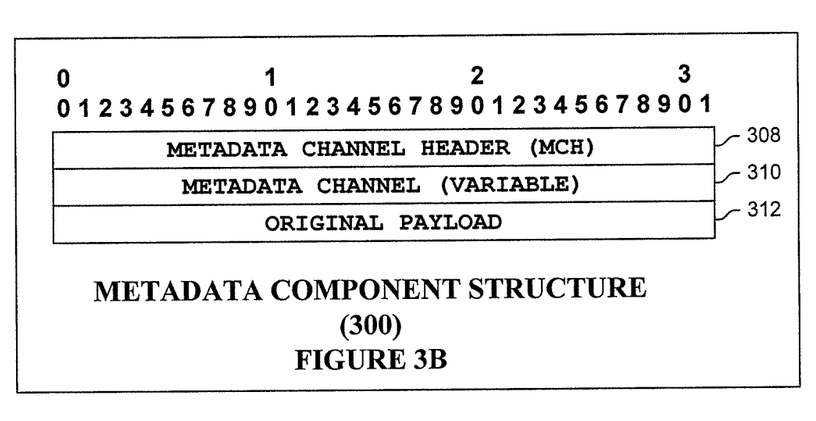
FIG. 3B illustrates a metadata component structure according to one embodiment.

FIG. 3B illustrates a common format 300 used in one embodiment to carry infrastructure metadata in Internet Protocol (IP) version 4 (IPv4) and version 6 (IPv6) packets, as well as in Multiprotocol Label Switching (MPLS) packets. Common format 300 includes a metadata channel header (MCH) 308 and a metadata channel 310 carrying metadata, followed by the original (L2, L3, MPLS) packet payload 312. MCH 308 indicates the type and structure of the metadata carried within the packet. Metadata channel 310 includes the actual metadata. Various mechanisms for encoding of the metadata is provided in one embodiment.

Figure 3C:
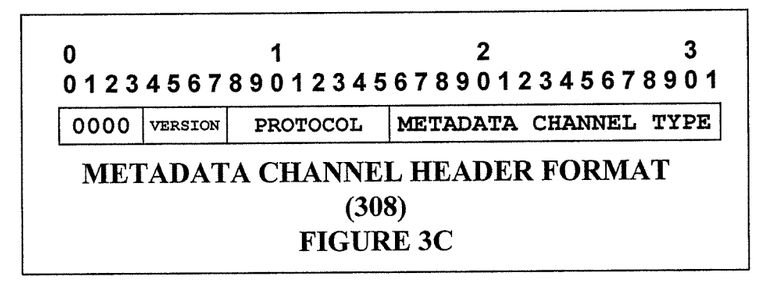
FIG. 3C illustrates a metadata channel header according to one embodiment.

MCH 308 used in one embodiment is illustrated in FIG. 3C, with the meanings of the fields in the MCH being:
  First Nibble: it is set to 0000b to indicate a Metadata Channel associated with IPv4, IPv6, or MPLS. In one embodiment, another value is used.
  Version: version number of the metadata channel.
  Protocol: Where the network layer is MPLS this field is set to a value of zero and ignored on reception. Where the network layer is IP, this carries the protocol number that identifies the protocol that follows the metadata (e.g., it contains the protocol number that would have been in the IP header if the metadata had not been inserted). Similarly if the network layer is IPv6 this is the final next-header value that would have been present if the metadata had not been inserted.

Metadata Channel Type: The Metadata Channel Type is a defined number (e.g., Internet Assigned Numbers (IANA) Authority Metadata Channel Type registry.

Figures 4, 5:
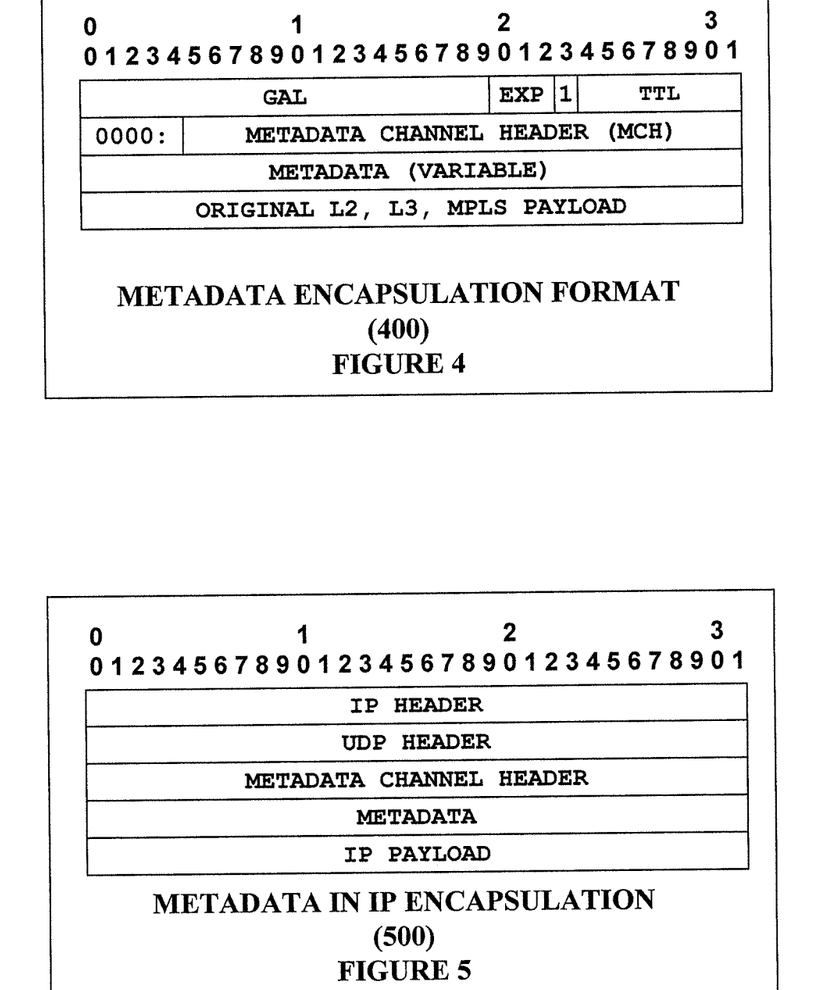
FIG. 4 illustrates a metadata encapsulation format according to one embodiment.
FIG. 5 illustrates a metadata in Internet Protocol (IP) encapsulation according to one embodiment.

FIG. 4 illustrates a metadata encapsulation format 400 used in one embodiment when including infrastructure data in MPLS packets. In one embodiment, the presence of metadata within an MPLS packet is indicated in the encapsulation. Generic Associated Channel Label (GAL) having a predetermined label value (e.g., 13) is used for this purpose. In one embodiment, the first nibble of the MCH is set to 0000b (or another predetermined value).

Metadata encapsulation format 400 used in one embodiment is illustrated in FIG. 4, with the meanings of the fields being:

The GAL (e.g., reserved label of value 13 or another predetermined value) is used to indicate that an associated channel header (ACH) or a metadata channel header (MCH) appears immediately after the bottom of the label stack. The first nibble of the channel header is used to identify whether the format is to be interpreted as an ACH or MCH. If the first nibble is set as 0000b (or another predetermined value), this indicates that an MCH will sit beneath the label stack. EXP is also referred to Traffic Class (TC).

Immediately following the MCH will be the metadata. Various mechanisms for encoding of the metadata is provided in one embodiment.

Beneath the metadata will be the original packet payload. This could be L2, L3 or MPLS payload.

One embodiment uses metadata encapsulation format 400 to carry infrastructure metadata in MPLS packets between the MCH and the original MPLS payload. In one embodiment, this mechanism is used for original MPLS packet with an IPv4, IPv6 or pseudo-wire payload.

When the original packet's payload was an MPLS payload, one embodiment creates a new label stack for the section over which the metadata is relevant and the original MPLS packet (MPLS label stack and MPLS payload) is carried in the payload section of the packet. For example in one embodiment, when a hierarchical LSP needs to be instrumented, this technique is used. Rather than pushing the labels associated with the hierarchical section onto the existing label stack, the original label stack is preserved and placed along with its associated payload in the payload section. A new label stack, indicating the presence of metadata (by way of the GAL "Generic Alert Label"), the MCH, and the metadata itself is then built for the MPLS section requiring instrumentation and sent.

In one embodiment, a packet switching or host device that is capable of processing infrastructure metadata advertises its capability so other devices in the network are aware of its capability. In one embodiment, a network management, operations systems, or operator informs other devices of this capability.

A metadata processing enabled "Label Switch Router (LSR) or Label Edge Router (LER) (which may be a core or edge router) processes packets carrying metadata and those without. If a GAL is present in the MPLS label stack, the receiving LSR/LER inspects the first nibble after the end of the label stack to identify the presence of an MCH, ACH, or IP, and processes the packet accordingly. An LSR/LER typically does not push a GAL on a packet that does not contain an MCH or an ACH.

In one embodiment, a LSR that receives a packet without metadata will process the received label stack (which might be empty) and payload based on normal MPLS processing rules.

In one embodiment, a packet with metadata received by the LSR will receive an MPLS packet constructed as follows:

<Top Label (TL), Application Label (AL), GAL><MCH><metadata><remaining packet payload>

The LSR/LER recognizes TL as the label it distributed to its upstream LSR/LER and pops the TL (note that the TL signaled by the receiving LSR/LSR may be an implicit null label, in which case it doesn't appear in the label stack and the receiving LSR/LER processes the packet starting with the AL label (if present) and/or the GAL label.) The receiving LSR/LER recognizes the GAL with S bit set, and processes the metadata, starting with the MCH (0000b) (or another predetermined value), which will determine how the LSR/LER processes the packet.

In one embodiment, the following operations are performed by a LSR/LER to insert infrastructure metadata (e.g., in response to receiving signaling that corresponding devices can process the metadata). The LSR/LER determines an application to which a received packet belongs and a corresponding egress LSR/LER. Based on these two components, the LSR/LER determines whether metadata will be added to the incoming packet.

For packets not requiring insertion of metadata, the packet is processed in the normal way, including pushing the TL and optionally the AL, determining the output interface, and transmitting the packet.

For packets requiring the insertion of metadata, the appropriate MCH is built and prepend it to the existing payload. The GAL label is pushed on to the label stack with the S bit set to 1. The AL label (if required) is pushed on to the label stack. If Entropy is required, then appropriate fields are selected as input to the load-balancing function, which is applied to generate the entropy label value. The entropy label indicator and entropy labels are pushed onto the label stack. The top label (TL) is determined and pushed on top of the entropy label indicator and entropy labels, if present. The ordering of application label (AL) and entropy label indicator and entropy labels is not critical other than the egress device processing the entropy indicator label must process all remaining labels in the stack and the metadata. The S bit for the entropy label indicator is set to zero (i.e., S bit is not set). The time-to-live value (TTL) for the entropy label is set to zero to ensure that it is not used inadvertently for forwarding. The traffic class (TC) for the entropy label may be any value.

FIG. 5 illustrates a metadata encapsulation format 500 used in one embodiment when including infrastructure data in IP packets. Metadata carried within an IP packet is carried in User Datagram Protocol (UDP) and is prefaced by a metadata channel header (MCH). The presence of metadata is identified by the UDP port number assigned for this purpose. An IP packet carrying metadata consists of the original IP header (except for the IP protocol type), a UDP header, the MCH, the metadata, and the original IP payload as shown in FIG. 5.

In one embodiment, a packet switching or host device inserts infrastructure metadata into an existing IP packet. This existing IP packet has been constructed in the normal way including the use of the normal protocol type or final next header type (IPv4 and Ipv6 respectively) to indicate the IP payload type, and the calculation of any transport layer checksums over the normal pseudo header.

In one embodiment, this insertion process is as follows. The IP header and in the case of IPv6 the next headers are removed from the packet and stored. The metadata is prepended to the IP payload. The MCH is prepended to the metadata. The IPv4 protocol type or the final IPv6 next header is copied from the stored IP header into the protocol field of the MCH. The UDP header is prepended to the MCH. The UDP destination port is set to <MCH-UDP> to indicate that an MCH follows. The UDP source port is used for load balancing. As this is a UDP tunnel, and the payload can be assumed to adequately protected before the inclusion of the metadata, the UDP checksum MAY be zero. The IP header is restored to the packet by prepending it to the UDP header. The IPv4 protocol field or the IPv6 final next header is overwritten with the value 17 (or some other predetermined value such as, but not limited to, corresponding to another IP type or tunnel) to indicate that a UDP header follows. Instead of inserting infrastructure metadata into an existing IP packet, the packet can be constructed ab initio with the metadata included.

In one embodiment, a packet switching or host device receives an IP packet including infrastructure metadata. The receipt of a packet with a UDP port of type <MCH-UDP> indicates the presence of metadata. The MCH is examined and checked for the initial nibble of zero and the MCH type is used to dispatch to the metadata process.

In one embodiment, a packet switching or host device removes the infrastructure metadata from an IP packet. One embodiment performs this operation as follows. The protocol field in the MCH is stored. The IP header is prepended to the IP payload overwriting the MCH and the metadata. The protocol field in the IP header is overwritten by the protocol field extracted from the MCH. The reconstructed IP packet is processed as normal. An application that is metadata aware typically does not de-construct the IP packet, and can extract the metadata directly.

Figure 6:
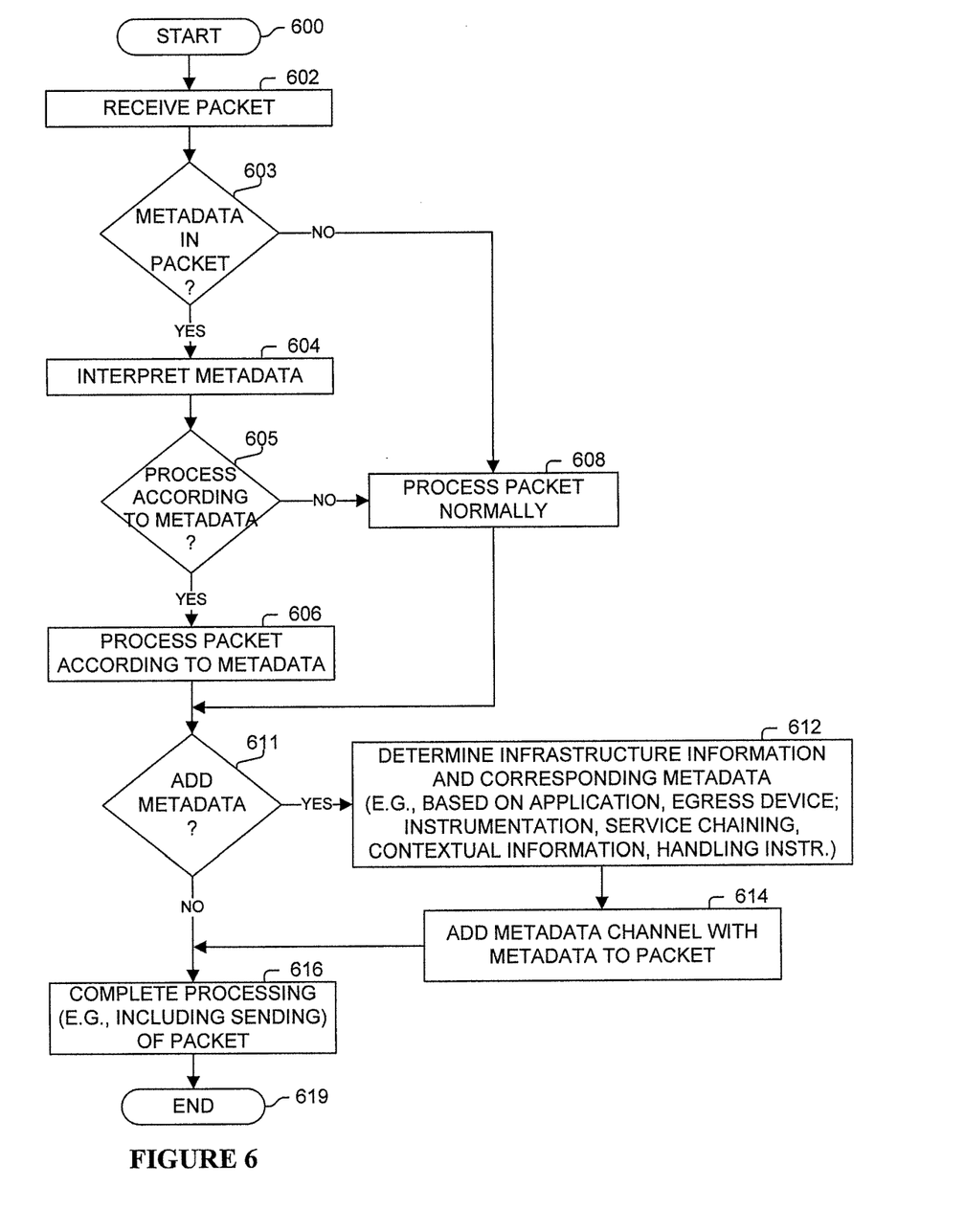
FIG. 6 illustrates a process performed in one embodiment.

FIG. 6 illustrates a process performed in one embodiment by a packet switching or host device. Processing begins with process block 600, and proceeds to process block 602, wherein a packet is received. In one embodiment, metadata is first added to a packet 612 (through process blocks 603, 608 and 611 or directly from process block 602).

As determined in process block 603, if the packet does not contain metadata, then in process block 608, the packet is processed normally.

As determined in process block 603, if the packet does contain metadata, then in process block 604, the infrastructure metadata is interpreted. As determined in process block 605, if the packet is not to be processed based on the interpreted metadata, then the packet is processed normally in process block 608. Otherwise, in process block 606, the packet is processed according to the metadata (e.g., service applied, OAM instrumentation operations performed, specific handling instructions followed).

Processing continues and converges at process block 611. As determined in process block 611, if metadata is to be added to the packet, then in process block 612, the infrastructure information and corresponding metadata encoding is determined (e.g., based on an application to be applied to the packet and/or egress device of the packet, to provide service chaining, contextual information, specific handling instructions, and/or packet instrumentation). In one embodiment, infrastructure information and corresponding metadata encoding is retrieved based on a lookup operation in a forwarding or other data structure using flow information related to the packet. In process block 614, the metadata channel including the metadata is inserted into the packet.

Processing continues and converges at process block 616, wherein processing of the packet is completed, typically including sending (or dropping of the packet). Processing of the flow diagram of FIG. 6 is complete as indicated by process block 619.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

receiving, by a first provider edge packet switching device in a provider network, a client packet from a client edge packet switching device in a client network;

determining, by the first provider edge packet switching device, particular metadata provider network signaling information to communicate infrastructure information associated with the client packet to a second provider packet switching device in the provider network, with said particular metadata provider network signaling information for use by at least the second provider packet switching device in processing the client packet, with said particular metadata provider network signaling information including a specific application to apply to the client, packet, contextual information specifying a profile or user name, or instrumentation information for measuring packet loss or latency; and adding, by the first provider edge packet switching device, to the client packet a metadata component structure including a metadata channel header and a metadata channel, with the metadata channel comprising said particular metadata provider network signaling information, and with the metadata component structure being placed between and external to the header and payload of the client packet;

sending, from the first provider edge packet switching device to the second provider packet switching device through the provider network, the client packet after said adding operation;

receiving, by the second provider packet switching device, the client packet including the metadata component structure including the metadata channel with said particular metadata provider network signaling information;

processing, by the second provider packet switching device, the client packet based on said particular metadata provider network signaling information; and sending, by the second provider packet switching device, the client packet from the provider network, directly or through another one or more provider packet switching devices in the provider network, wherein the metadata component structure including the metadata channel with said particular metadata provider network signaling information is removed from the client packet by a provider packet switching device of the provider network prior to the client packet exiting the provider network.

2. The method of claim 1, wherein said particular metadata provider network signaling information includes information for measuring packet loss or latency within the provider network.

3. The method of claim 1, wherein said particular metadata provider network signaling information includes the specific application to apply to the packet within the provider network.

4. The method of claim 1, wherein said particular metadata provider network signaling information includes contextual information specifying a profile or user name for processing of the client packet within the provider network.

5. The method of claim 1, wherein the client packet is a Multiprotocol Label Switching (MPLS) packet.

6. The method of claim 1, wherein the client packet is an Internet Protocol (IP) packet.

7. A provider network, comprising:
a first provider edge packet switching device, including one or more first processors; first memory; a first plurality of interfaces configured to send and receive packets; and one or more first packet switching mechanisms configured to packet switch packets among the first plurality of interfaces; and
a second provider packet switching device, including one or more second processors; second memory; a second plurality of interfaces configured to send and receive packets; and one or more second packet switching mechanisms configured to packet switch packets among the second plurality of interfaces;
wherein the first provider edge packet switching device is configured to perform operations including: receiving a client packet from a client edge packet switching device in a client network; particular metadata provider network signaling information to communicate infrastructure information associated with the client packet to the second provider packet switching device, with said particular metadata provider network signaling information for use by at least the second provider packet switching device in processing the client packet, with said particular metadata provider network signaling information including a specific application to apply to the client packet, contextual information specifying a profile or user name, or instrumentation information for measuring packet loss or latency;
adding to the client packet a metadata component structure including a metadata channel header and a metadata channel, with the metadata channel comprising said particular metadata provider network signaling information, and with the metadata component structure being placed between and external to the header and payload of the client packet; and sending the client packet after said adding the metadata component structure to the second provider packet switching device; and
wherein the second provider packet switching device is configured to perform operations including: receiving the client packet including the metadata component structure including the metadata channel with said particular metadata provider network signaling information; processing the client packet based on said particular metadata provider network signaling information; and sending the client packet from the provider network, directly or through another one or more provider packet switching devices in the provider network, wherein the metadata component structure including the metadata channel with said particular metadata provider network signaling information is removed from the client packet by a provider packet switching device of the provider network prior to the client packet exiting the provider network.

8. The provider network of claim 7, wherein said particular metadata provider network signaling information includes information for measuring packet loss or latency.

9. The provider network of claim 7, wherein said particular metadata provider network signaling information includes the specific application to apply to the packet.

10. The provider network of claim 7, wherein said particular metadata provider network signaling information includes contextual information specifying a profile or user name for processing of the client packet.

11. The provider network of claim 7, wherein the client packet is a Multiprotocol Label Switching (MPLS) packet.

12. The provider network of claim 7, wherein the client packet is an Internet Protocol (IP) packet.

13. A method, comprising:
receiving, by a first provider edge packet switching device in a provider network, a client packet from a client edge packet switching device in a client network;
determining, by the first provider edge packet switching device, particular metadata provider network signaling information to communicate infrastructure information associated with the client packet to a second provider packet switching device in the provider network, with said particular metadata provider network signaling information for use by at least the second provider packet switching device in processing the client packet, with said particular metadata provider network signaling information including a specific application to apply to the client packet, contextual information specifying a profile or user name, or instrumentation information for measuring packet loss or latency; and
adding, by the first provider edge packet switching device, to the client packet a metadata component structure including a metadata channel header and a metadata channel, with the metadata channel comprising said particular metadata provider network signaling information, and with the metadata component structure being placed between and external to the header and payload of the client packet; and
sending the client packet after said adding operation from the first provider edge packet switching device to the second provider packet switching device.

14. The method of claim 13, wherein said particular metadata provider network signaling information includes information for measuring packet loss or latency within the provider network.

15. The method of claim 13, wherein said particular metadata provider network signaling information includes the specific application to apply to the packet within the provider network.

16. The method of claim 13, wherein said particular metadata provider network signaling information includes contextual information specifying a profile or user name for processing of the client packet within the provider network.

17. A method, comprising:
receiving, by a second provider packet switching device, a client packet including a metadata component structure including a metadata channel header and a metadata channel, with the metadata channel comprising particular metadata provider network signaling information, and with the metadata component structure being located between and external to the header and payload of the client packet, with said particular metadata provider network signaling information defining to the provider network information for processing the particular packet, with said particular metadata provider network signaling information including a specific application to apply to the client packet, contextual information specifying a profile or user name, or instrumentation information for measuring packet loss or latency;

processing, by the second provider packet switching device, the client packet based on said particular metadata provider network signaling information, including removing said particular metadata provider network signaling information from the client packet; and sending the client packet without said particular metadata provider network signaling information from the provider network directly or through another one or more provider packet switching devices in the provider network.

18. The method of claim 17, wherein said particular metadata provider network signaling information includes information for measuring packet loss or latency within the provider network.

19. The method of claim 17, wherein said particular metadata provider network signaling information includes the specific application to apply to the packet within the provider network.

20. The method of claim 17, wherein said particular metadata provider network signaling information includes contextual information specifying a profile or user name for processing of the client packet within the provider network.

* * * * *